US012690101B2

(12) United States Patent
Jungen et al.

(10) Patent No.: US 12,690,101 B2
(45) Date of Patent: Jul. 21, 2026

(54) ELECTRICAL UNIT OR LIGHT FOR A DC NETWORK

(71) Applicant: Zumtobel Lighting GmbH, Dornbirn (AT)

(72) Inventors: Christian Jungen, Dornbirn (AT); Sascha Skergeth, Dornbirn (AT)

(73) Assignee: Zumtobel Lighting GmbH, Dornbirn (AT)

( * ) Notice: Subject to any disclaimer, the term of this patent is extended or adjusted under 35 U.S.C. 154(b) by 148 days.

(21) Appl. No.: 18/727,851

(22) PCT Filed: Feb. 1, 2023

(86) PCT No.: PCT/EP2023/052414
§ 371 (c)(1),
(2) Date: Jul. 10, 2024

(87) PCT Pub. No.: WO2023/148205
PCT Pub. Date: Aug. 10, 2023

(65) Prior Publication Data

US 2025/0106962 A1 Mar. 27, 2025

(30) Foreign Application Priority Data

Feb. 3, 2022 (DE) ..................... 10 2022 102 526.8

(51) Int. Cl.
*F21V 21/35* (2006.01)
*F21V 21/005* (2006.01)
(Continued)

(52) U.S. Cl.
CPC ........... *H05B 45/30* (2020.01); *F21V 21/005* (2013.01); *F21V 21/35* (2013.01); *F21V 23/06* (2013.01); *F21V 25/04* (2013.01); *H01R 25/162* (2013.01)

(58) Field of Classification Search
CPC ....... H05B 45/30; F21V 21/00; F21V 21/005; F21V 21/35; F21V 23/00; F21V 23/04;
(Continued)

(56) References Cited

U.S. PATENT DOCUMENTS

2014/0049954 A1* 2/2014 Ladstaetter ............... F21S 4/20 362/221
2018/0058677 A1* 3/2018 Wu ...................... H05B 45/375
(Continued)

FOREIGN PATENT DOCUMENTS

CN 204062928 U 12/2014
DE 102012015542 A1 * 2/2014 ........... H01R 25/142
(Continued)

OTHER PUBLICATIONS

PCT/EP2023/052414, International Search Report and Written Opinion dated Mar. 20, 2023, 15 pages, English translation, 7 pages.

*Primary Examiner* — Thai Pham
(74) *Attorney, Agent, or Firm* — Andrus Intellectual Property Law, LLP

(57) ABSTRACT

The invention relates to a luminaire (10) or electrical unit which is intended to be supplied with voltage via a DC supply circuit (90) and has means for power consumption (19) from the DC supply circuit (90), a connection element (20) for coupling to the DC supply circuit (90) in order to electrically connect the means for power consumption (19) to the DC supply circuit, and a switching element (30), by means of which the luminaire (10) or the electrical unit can be switched to electrically load-free before the connection element (20) is coupled to the DC supply circuit (90) or before the coupling is released.

14 Claims, 8 Drawing Sheets

(51) Int. Cl.
*F21V 23/06* (2006.01)
*F21V 25/04* (2006.01)
*H01R 25/16* (2006.01)
*H05B 45/30* (2020.01)

(58) Field of Classification Search
CPC ....... F21V 23/06; F21V 25/04; H01R 25/147; H01R 25/162
See application file for complete search history.

(56) References Cited

U.S. PATENT DOCUMENTS

| | | | | |
|---|---|---|---|---|
| 2021/0321499 | A1* | 10/2021 | Hayman | H05B 45/20 |
| 2022/0307662 | A1* | 9/2022 | Hierzer | H01R 25/142 |
| 2022/0307676 | A1* | 9/2022 | Hierzer | F21V 21/025 |
| 2022/0307679 | A1* | 9/2022 | Hierzer | F21V 23/0435 |

FOREIGN PATENT DOCUMENTS

| | | | | |
|---|---|---|---|---|
| DE | 102016114985 A1 | 3/2017 | | |
| DE | 202018106674 U1 | 2/2020 | | |
| EP | 2375128 A1 | 10/2011 | | |
| EP | 2375128 B1 | * | 6/2019 | F21V 15/01 |
| WO | 2001091250 A1 | 11/2001 | | |

* cited by examiner

ELECTRICAL UNIT OR LIGHT FOR A DC NETWORK

CROSS-REFERENCE TO RELATED APPLICATION

The present application is the U.S. national stage application of international application PCT/EP2023/052414 filed Feb. 1, 2023, which international application was published on Aug. 10, 2023 as International Publication WO 2023/148205 A1. The international application claims priority to German Patent Application No. 10 2022 102 526.8, filed Feb. 3, 2022.

TECHNICAL FIELD OF THE INVENTION

The present invention relates to a luminaire or, more generally, an electrical unit which is intended, for example, for use in a light trunking system. The electrical unit is designed to be supplied with direct current.

BACKGROUND OF THE INVENTION

Elongate light trunking systems are used in a variety of ways in public buildings or industrial facilities. A known light trunking system is marketed by the applicant under the designation "TECTON," and is characterized in that luminaires or other electrical consumers can be flexibly positioned, over the entire length of the system, on a trunking rail which constitutes the central carrier element of the light trunking system. This is made possible in the TECTON system by the fact that a special mounting of the conductors used for power supply allows said conductors to be accessed by consumers over substantially the entire length of the light trunking system, such that the conductors can be contacted not only at fixed, predetermined positions but at any position. A light trunking system of this kind is shown in WO 2001/091250 A1, for example.

In these known light trunking systems, the luminaires or other consumers to be connected are usually supplied with an alternating voltage of 230 V. This type of power supply has proven effective over the last few decades and allows a number of luminaires or other consumers to be reliably supplied with power even over a longer light trunking system. In this case, appropriate precautionary measures must be taken to ensure that the live lines are not accidentally touched.

However, there have recently been considerations, in deviation from the previous power supply via alternating voltage, to implement DC networks to supply a number of consumers. Such considerations concern, in particular, DC networks limited to specific areas, for example those which supply consumers with electricity within factories. In this case, a central AC-DC converter supplies all load areas in the factory with direct current, which increases the overall energy efficiency of the system and eliminates the need for rectifiers which are usually required in the appliances being supplied. Another advantage of such DC networks is that solar modules and storage devices such as batteries and capacitors can be easily connected to the grid because they work directly with direct current. Furthermore, using direct current leads to a reduced need for copper in the power supply cables, meaning that the material expenditure for implementing corresponding supply networks can also be reduced. Current developments are geared toward operating such DC networks with a supply voltage of 540 V or even 650 V.

In principle, it would be desirable to also integrate the components used for lighting into such DC networks. A problem then arising in this case is that, as indicated above, there is a significantly higher voltage on the power supply lines compared with the 230 V alternating voltage. In this case, it is thus not only important to ensure that the lines providing the DC voltage are not accidentally touched, but there is also the risk that when establishing an electrical connection between a consumer and the power supply lines and, in particular, when disconnecting, an arc or sparks may occur. This represents a significant source of danger which should be avoided.

SUMMARY OF THE INVENTION

The object of the present invention is therefore that of providing a way to connect luminaires or other electrical units to a DC supply circuit in a simple but safe manner.

The object is achieved by a luminaire or, more generally, an electrical unit having the features of claim 1. Advantageous developments of the invention are the subject-matter of the dependent claims.

The risk of an arc occurring is particularly high if the luminaire or electrical unit is still consuming energy when the electrical connection is disconnected. In this case, even a small distance between the components establishing the electrical connection can cause current to jump and thereby ignite an arc. However, if the luminaire or electrical unit is switched to load-free at the moment the electrical coupling is released, i.e., it is not consuming any energy, the electrical connection can be disconnected safely.

According to the present invention, therefore, the luminaire or electrical unit has an additional switching element, by means of which the luminaire or electrical unit can be switched to electrically load-free before the coupling of an electrical connection element to a DC supply circuit is released.

According to the invention, a luminaire or electrical unit is proposed which is intended to be supplied with voltage via a DC supply circuit, wherein the luminaire or electrical unit has:

means for power consumption from the DC supply circuit, a connection element for coupling to the DC supply circuit in order to electrically connect the means for power consumption to the DC supply circuit, and a switching element, by means of which the luminaire or the electrical unit can be switched to electrically load-free before the connection element is coupled to the DC supply circuit.

In the case of a luminaire representing the preferred exemplary application of the present invention, the means for power consumption are formed by lamps and in particular a driver which is designed to convert the voltage provided by the DC supply circuit into an operating voltage for the lamps and to operate the lamps.

A simple way to transfer the luminaire or electrical unit to a load-free state could be to design the switching element in such a way that when the switching element is actuated, an electrical connection between the connection element and the driver or the means for power consumption is disconnected. In this case, the switching element thus causes a complete interruption of the power supply. However, it is then in turn necessary to design the switching element itself to be sufficiently robust and secure in order to ensure that the internal formation of an arc or sparks is avoided to the greatest possible extent.

According to a preferred variant of the present invention, therefore, the switching element is designed in such a way that, when actuated, it does not interrupt the actual power supply, but instead causes the driver or the means for power consumption to switch to a load-free standby mode. For this purpose, the switching element can in particular be used to interrupt or close only a control line leading to the driver or the means for power consumption, wherein the means for power consumption are then designed to switch to the required load-free standby mode in the absence of a signal supplied via the control line or when an interruption of the control line or a closure of the control line is detected. From an electrical perspective, interrupting or closing the control line is easier and less problematic due to the significantly lower voltage, and therefore in this case the switching element can have a very simple design. For this purpose, it would be conceivable to use a control line which is provided for transmitting control signals during the actual operation of the overall system. Preferably, the control line can be what is known as a DALI line, which has only a low voltage of approximately 16 V during the transmission of DALI signals.

Regardless of the manner in which the switching element leads to a change to a load-free state of the luminaire or the electrical unit, the means for power consumption can preferably be designed not to immediately switch to power-consuming normal operation after the power supply is restored or when a signal is again applied to the control line. Instead, it is intended that only after a separate activation signal is received do the driver or the means for power consumption perform a regular start and thus consume energy again. As explained in more detail below, this is an additional safety measure which allows safe connection to and disconnection from the DC supply circuit.

As already mentioned at the outset, it is preferable for the luminaire or electrical unit to be used to form an elongate light trunking system. Accordingly, as per a preferred embodiment, the luminaire or electrical unit is designed to be detachably fastened to a carrier element of a light trunking system, wherein the carrier element holds power supply lines which form the DC supply circuit.

In this case, the luminaire or electrical unit can have at least one mechanical fastening element for detachable fastening to the carrier element, which can preferably be moved between an open position, in which the luminaire or electrical unit can be attached to the carrier element or removed from the carrier element, and a locking position, in which the luminaire or electrical unit is locked to the carrier element.

According to a particularly preferred embodiment, in this case the fastening element can then be coupled to the switching element in such a way that the switching element is in a position which switches the luminaire or electrical unit to load-free when the fastening element is in the open position. If, for example, a luminaire according to the invention is to be disconnected from the DC supply network for maintenance work, the fastening element must first be moved to the open position in order to release the mechanical fastening to the carrier element. According to the invention, this then leads to the luminaire being automatically transferred to a load-free state.

The connection element can in particular be formed by the fastening element, wherein electrical contacts are then arranged on the fastening element which contact lines of the DC supply circuit when the fastening element is in the locking position, and wherein the contacts do not contact the lines of the DC supply circuit when the fastening element is in the open position. In this case, the fastening element is then preferably coupled to the switching element in such a way that, upon exiting the locking position, the switching element is brought into a position which switches the luminaire or electrical unit to electrically load-free before the electrical connection between the contacts and the lines of the DC supply circuit is interrupted. The unlocking process for mechanically releasing the luminaire or electrical unit from the carrier element therefore results in the load-free state being reached first and the electrical connection being safely interrupted thereafter.

Preferably, the fastening element in this case is rotatably mounted and in particular designed in the form of a rotary knob. Alternatively, however, solutions would also be conceivable in which the lines of the DC supply circuit are contacted by a linear (e.g., lateral) movement or another kind of movement.

As an alternative to the solution described above, the connection element which is to be coupled to the DC supply circuit can also be a connector, wherein said connector is particularly preferably connected to the means for power consumption via a flexible cable or bunched cable, and wherein a strain relief element acting on the cable or bunched cable is provided on the luminaire or electrical unit. Again—after the luminaire has been mechanically detached from the carrier element and switched to load-free according to the invention—it can then be safely electrically disconnected from the DC supply network.

According to the invention, a light trunking system is further proposed which has:

- an elongate carrier element,
- power supply lines which extend along the carrier element and are designed to supply a high-voltage DC voltage,
- at least one luminaire or electrical unit as described above, which can be coupled to the power supply lines.

The power supply lines of the light trunking system can in this case have contact elements at regular intervals, which can be coupled to the connection element of the luminaires or electrical units to be connected. A continuous contacting option, as is the case with the TECTON system mentioned above, would also be conceivable. In this case, it would be particularly appropriate for the connection element to be formed as described by the fastening element, which can then be designed in particular in the form of a rotary knob.

Furthermore, the carrier element can be formed, in a similar way to known light trunking systems, by a substantially U-shaped, downwardly open trunking rail, in the interior of which the power supply lines extend.

BRIEF DESCRIPTION OF THE DRAWINGS

The invention is explained in more detail in the following using the accompanying drawings. In the figures:

FIGS. 8*a* and 8*b* are representations of the interaction between the fastening element and the switching element of a luminaire according to a second exemplary embodiment according to the invention in the case where the fastening element is in the open position.

DETAILED DESCRIPTION OF THE EXEMPLARY EMBODIMENTS

The invention is explained below primarily using the example of what is known as a strip luminaire, which is used in a light trunking system. However, as is already explained and will be set out in more detail below, the concept according to the invention can also be used with other electrical units, in particular with such electrical units which in turn support the function of a light strip as supplementary components.

The light trunking system according to the invention, which is shown in the figures and generally given the reference sign 100, is similar to known light trunking systems in terms of its external appearance. As with the known "TECTON" system mentioned above, the light trunking system 100 according to the present invention also initially has an elongate trunking structure which is formed by a trunking rail 80. This may involve a plurality of individual profile parts which are joined together in the longitudinal direction and form the central carrier structure of the system 100, on the underside of which a plurality of luminaires 10 are arranged one behind the other in order to achieve a light emission that is as uninterrupted as possible over the length of the system 100. Branches or cross-like structures would also in principle be conceivable for the trunking structure.

Figure 1:
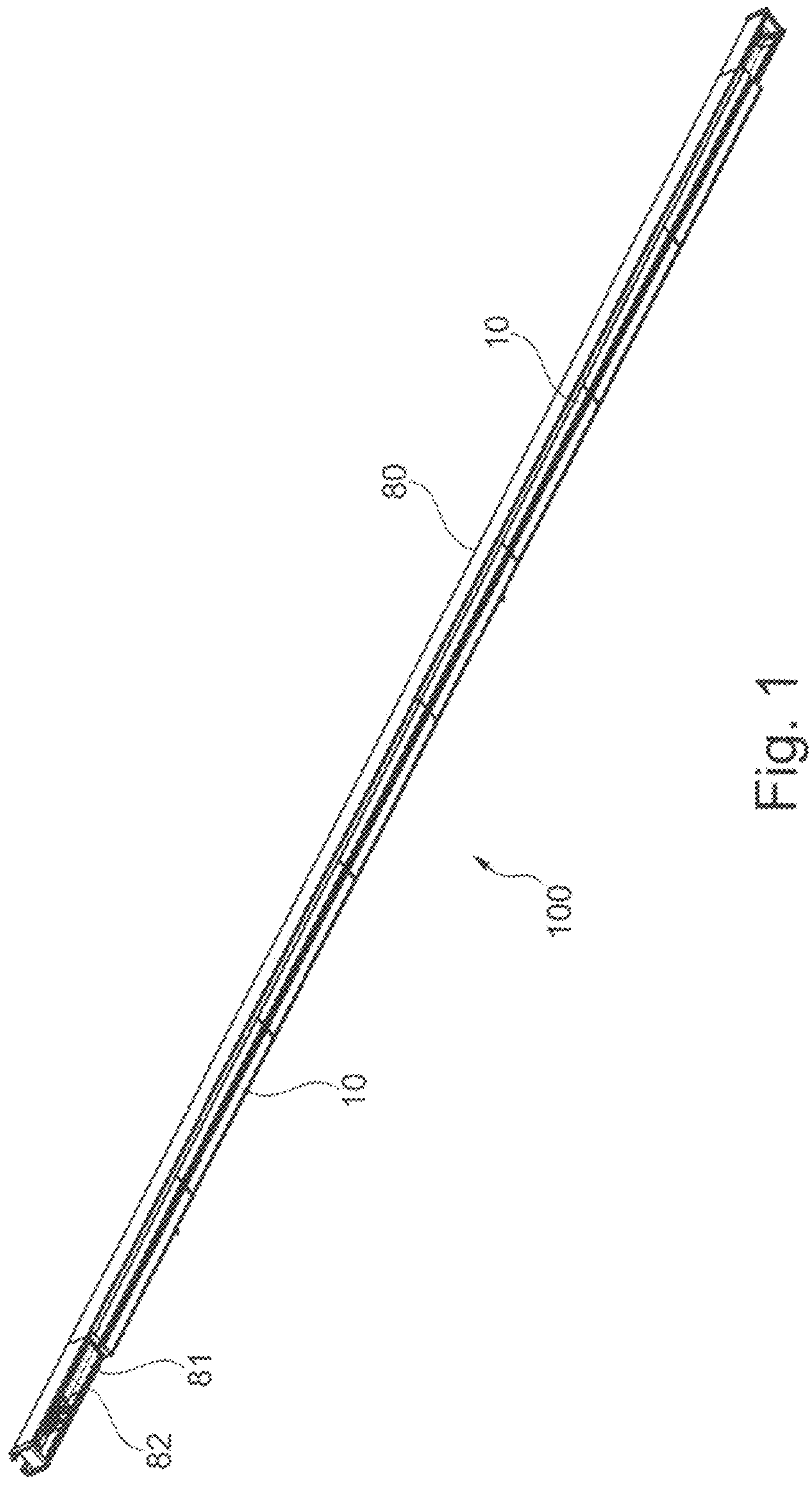
FIG. 1 is a view of a light trunking system designed according to the invention.
Figure 2:
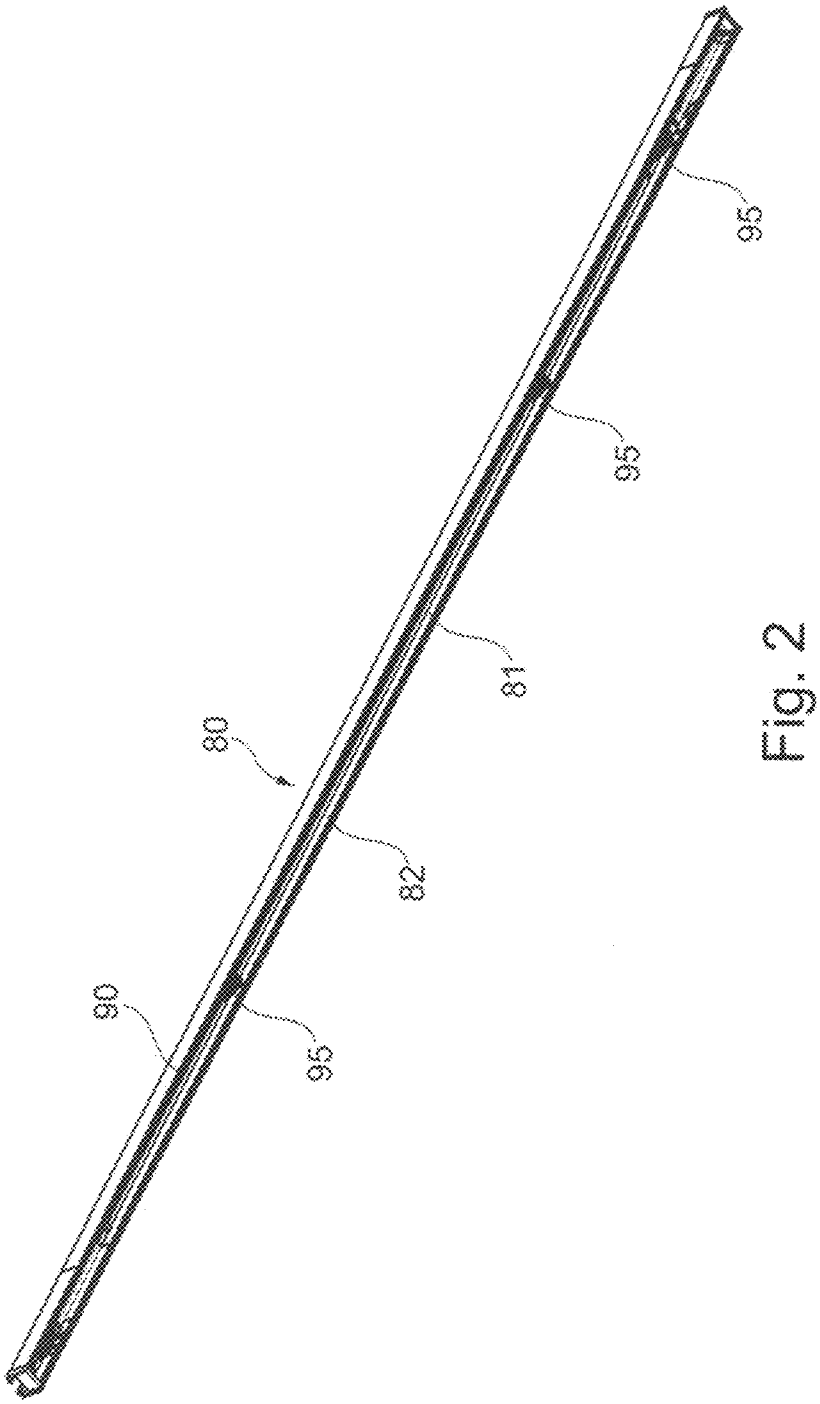
FIG. 2 is a representation of the trunking rail of the light trunking system of FIG. 1 without luminaires arranged thereon.
Figure 3:
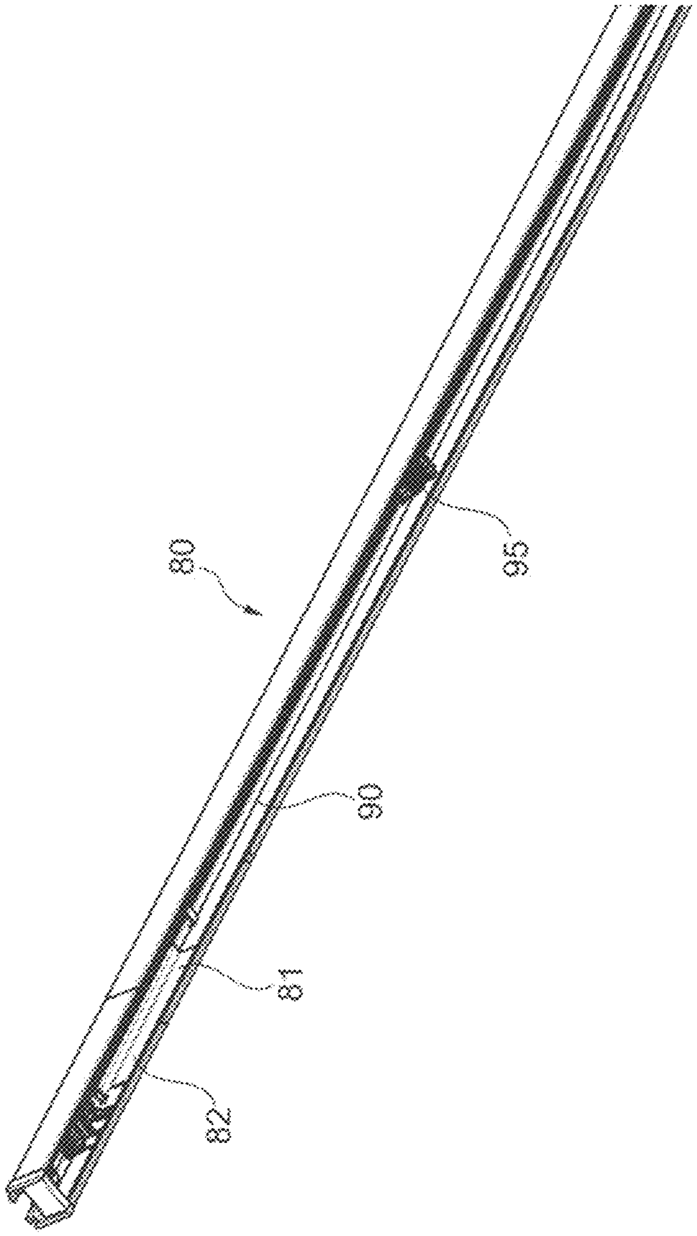
FIG. 3 is an enlarged view of the end region of the trunking rail according to FIG. 2.

As already mentioned, the trunking rail 80 forms the central trunking structure of the light trunking system 100. Said rail is thus used for the mechanical fastening of the units to be connected, in particular luminaires, and, furthermore, the trunking rail 80 also provides an electrical supply to the connected units and transmits signals which, for example, allow the units to communicate with each other and/or with a central control unit. For this purpose, extending in the interior 81 of the downwardly open trunking rail, which has an approximately C-shaped cross section, there are lines (see in particular FIG. 3) which are used for power supply and/or signal transmission. As is usually the case with such light trunking systems, units to be connected can then be attached from the underside, via the elongate opening 82, to the trunking rail 80, where they are mechanically fastened. In addition, they are also connected to the lines extending in the trunking rail 80.

A special feature of the light trunking system 100 shown is that the units to be connected are not powered by means of alternating current, as has previously been the case, but by means of direct current. The voltage provided will usually be approximately 540 or 650 volts and is therefore significantly higher than the 230 volts normally used in an AC power supply.

In the first exemplary embodiment described below—in contrast to classic light trunking systems in which the power supply lines often extend openly in what are known as busbars, which offer, at least over a certain length, a continuous contacting option for luminaires to be connected—additional safety measures are provided to prevent accidental contact with the live lines.

In this case, the lines of the DC supply circuit 90 used for the power supply therefore extend in the form of insulated, high-voltage-resistant lines along the trunking rail 80, wherein coupling elements in the form of contact sockets 95 are arranged at regular intervals, which allow units of the light trunking system 100 to be connected to the DC supply circuit 90.

Figures 4, 5:
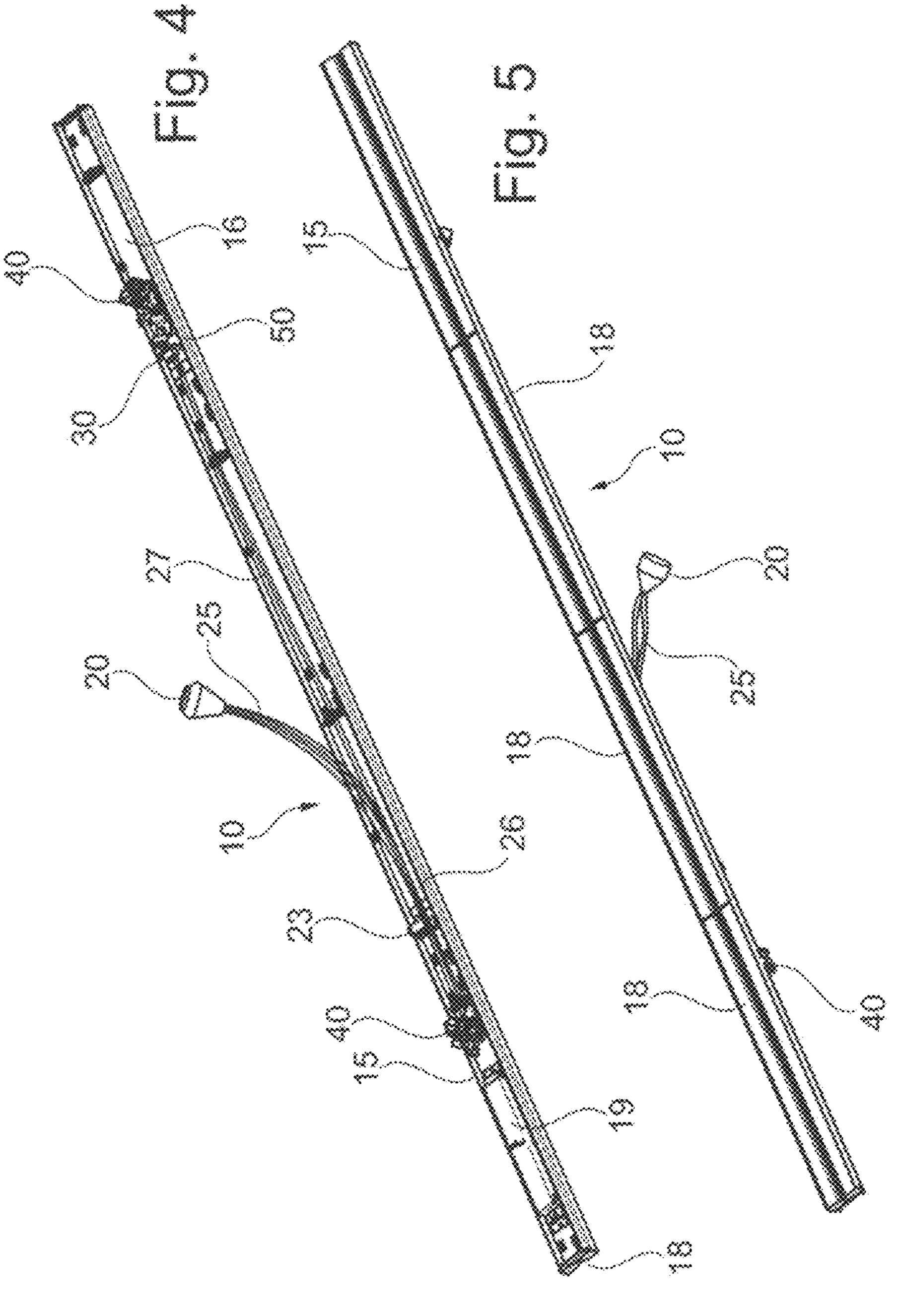
FIGS. 4 and 5 are views of a first exemplary embodiment of a luminaire designed according to the invention.

As shown in FIGS. 4 and 5, the units to be connected, for example the luminaire 10 shown, then have a corresponding connector 20, which is coupled to a contact socket 95 located nearby at the desired position of the luminaire 10, in order to ensure the power supply. The connector 20 and the socket 95 are designed in such a way that accidental contact with live wires during the coupling process is impossible. In addition to the lines used for power supply, a corresponding connection can also be made to one or more lines used for signal transmission or, more generally, communication, so that no separate coupling process is required for this. These lines used for data communication can, for example, be bus lines as per the known DALI bus, although other communication standards or other bus systems can of course also be used.

The luminaire shown in the figures is designated by the reference sign 10 and is what is known as a strip luminaire, as is often used in light trunking systems. The central element of the luminaire 10 is initially an elongate carrier element 15, which can be formed, for example, in the form of a profiled sheet-metal part which has a slightly C-like structure with a base surface 16 extending horizontally in the longitudinal direction and two side walls. The various components of the luminaire 10 are then arranged on the base surface 16, wherein the lamps (not shown in the figures) arranged on the underside, i.e., the side intended for light emission, are mentioned first here. These lamps can, for example, be elongate LED boards by means of which light can be emitted over the entire length of the luminaire 10. In the case shown, these lamps are surrounded by an optical part 18 which influences the light emitted by the lamps in the desired manner. Of course, such optical parts 18 can be designed in a wide variety of ways and it would also be conceivable that, in addition to the optical part 18 shown, further secondary optical parts are also used.

The components required to operate the lamps are then arranged on the rear side of the base surface 16, which is the side opposite the lamps. The components in this case are a driver 19 which, after supplying power via the DC supply circuit 90, converts the DC voltage provided into an operating voltage suitable for operating the lamps. This can be done, for example, on the basis of signals received via the control line(s), so that, as is known in light trunking systems, the light emission of the luminaires 10 can be controlled via a central control unit.

In the case shown, the luminaire 10 is mechanically fastened to the trunking rail 80 using two fastening elements 40. These are arranged at the two opposite end regions of the carrier element 15 and are in the form of rotary knobs. This means that the fastening elements 40 are rotatably mounted about an axis I which is perpendicular to the plane of the carrier element 16. In particular, they can be rotated between an open position (shown in FIGS. 6*a* and 6*b*), in which they are oriented such that they can be inserted into the interior 81 of the trunking rail 80 via the trunking rail opening 82, and a locking position (shown in FIGS. 7*a* and 7*b*). When rotated from the open position to the locking position, locking projections 42 provided on the fastening element 40 are rotated or pivoted outward, and in this position then latch onto corresponding projections of the trunking rail 80 in such a way that a mechanical locking is achieved and the luminaire 10 is thereby fastened to the trunking rail 80. Each fastening element 40 is pivoted by means of laterally projecting actuating arms 45 which pass through openings in the side walls of the carrier element 15.

This type of mechanical fastening of electrical units to trunking rails is also already known from the prior art, although in known light trunking systems the fastening elements are additionally used to contact the lines extending in the busbars. This is not the case in the present case with the first exemplary embodiment. Depending on the design, in particular on the length of the corresponding unit to be connected, the number of fastening elements 40 can also vary. A short sensor or, for example, a spotlight could therefore also have only a single fastening element 40, whereas longer units such as the luminaire 10 shown also have two or possibly even more fastening elements 40.

The illustrated luminaire 10 is now connected to the trunking rail 80 and the DC supply circuit 90 in such a way that, in a first step, the connector 20 is coupled to a contact socket 95 located in the desired position of the luminaire 10.

The connector 20 is coupled to the driver 19 via a flexible cable or a bunched cable 25, wherein said driver is preferably secured to the luminaire 10 via additional strain relief means 23. The bunched cable 25 in this case comprises the lines for the DC power supply 26 as well as the line 27 used for signal transmission. The bunched cable has a length of, for example, one meter, so that, after connecting the connector 20 to the DC supply circuit 90, it is possible to position the luminaire 10 freely on the trunking rail 80 within a certain range and to fasten it mechanically using the rotary knobs 40.

The luminaire 10 is then decoupled from the trunking rail 80 in a corresponding manner. First, the mechanical locking is released by rotating the rotary knobs 40 to the open position and the luminaire 10 is easily removed from the trunking rail 80. This provides access to the interior 81 of the trunking rail 80 and the connector 20 can then be detached from the corresponding contact socket 95.

However, it should be noted that, due to the relatively high voltage applied to the lines of the DC supply circuit 90, the voltage can jump over and ignite an arc as soon as the connector 20 approaches the contact socket 95. This situation must be prevented for safety reasons, which is why the luminaire 10 according to the invention is provided with additional safety measures to prevent the formation of an arc or sparks during the establishment or disconnection of the electrical connection.

The solution according to the invention is based on the concept of ensuring that at the time of electrical coupling, but in particular at the time of decoupling the luminaire 10 from the DC supply circuit 90, the luminaire 10 is in what is termed a load-free state. In this state, in which the luminaire 10 or the driver 19 is not consuming any significant power from the DC supply circuit 90, the connector 20 can be safely connected to the contact sockets 95 or the connector 20 can be disconnected. The luminaire 10 shown is now designed in such a way as to ensure that it is actually in a load-free state at the time of connection to the DC supply circuit 90 or when the electrical connection is disconnected.

A switching element 30 arranged on the carrier element 15 is responsible for transferring the luminaire 10 into the desired load-free state. This is actuated in the manner described in more detail below and, in a corresponding switching state, causes the driver 19 to switch to a standby mode. Before establishing or disconnecting the electrical connection, the switching element 30 must therefore be actuated, which then results in the luminaire 10 switching to the required load-free state.

In principle, it would be conceivable to design the switching element 30 in such a way that it completely interrupts the electrical connection between the connector 20 and the driver 19. In this case, the switching element 30 would thus interrupt the lines 26 which are used for the power supply and extend from the connector 20 to the driver 19. However, since in this case the switching element 30 also has to have a more complex design in order to allow the live lines 26 to be readily interrupted, according to a particularly preferred embodiment shown in the figures the switching element 30 only interrupts the line 27 used for signal transmission.

This control line 27 therefore initially leads from the connector 20 via the strain relief means 23 to the switching element 30 and only then from there to the driver 19. An interruption of the control line 27 by the switching element 30 results in the driver 19 detecting that a control signal is no longer being applied to the corresponding signal input or that the control line 27 has been interrupted. This causes the driver 19 to automatically switch to a standby mode in which no power is consumed from the DC supply circuit 90. This standby mode also represents a suitable load-free state of the luminaire 10, in which the luminaire 10 can be safely connected to or disconnected from the DC supply circuit 90.

As an additional safety measure, it can be the case that, in the event that the interruption of the control line 27 (or analogously of the lines 26 used for the power supply) is ended again, the driver 19 does not immediately switch back to an operating mode and draw power from the DC supply circuit 90. Instead, a regular start of the driver 19 is effected only after transmission of an explicit start signal—for example from a central control unit or by manual actuation of a corresponding control element in the form of, for example, a reset button.

The switching element 30 thus ensures that safety is additionally increased when connecting the luminaire 10 to the DC supply network 90. It would be conceivable to design this switching element 30 as a separate component which is manually operated by the electrician during the installation of the luminaire 10 on the trunking rail 90. In the illustrated exemplary embodiment, however, an additional, particularly advantageous measure is provided in which the switching element 30 is automatically in a position in which the luminaire 10 is switched to load-free when the luminaire 10 is to be connected to or disconnected from the trunking rail 80.

Figure 6A:
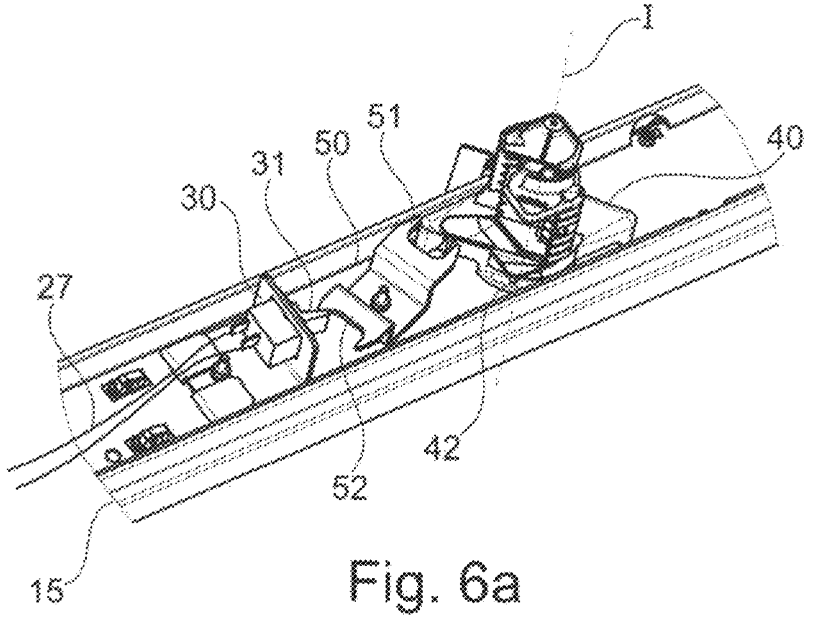
FIGS. 6*a* and 6*b* are representations of the interaction between the fastening element and the switching element of the luminaire of FIGS. 4 and 5 in the case where the fastening element is in the open position.
Figure 6B:
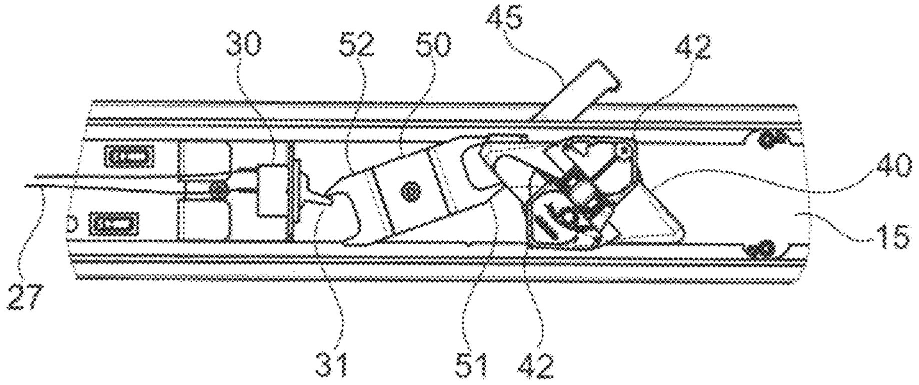
Figure 7A:
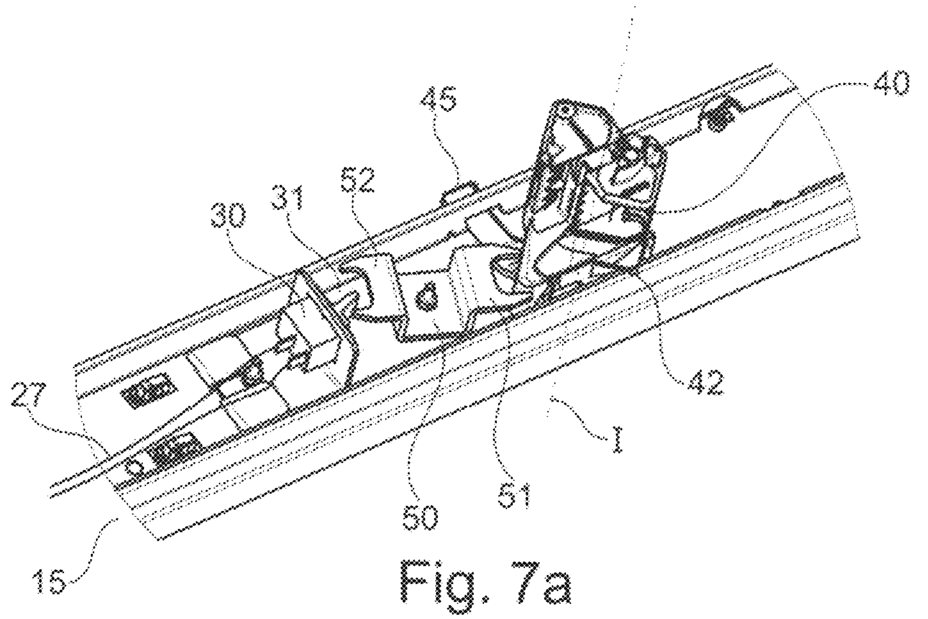
FIGS. 7*a* and 7*b* are representations corresponding to FIGS. 6*a* and 6*b*, wherein the fastening element is now in the locking position.
Figure 7B:
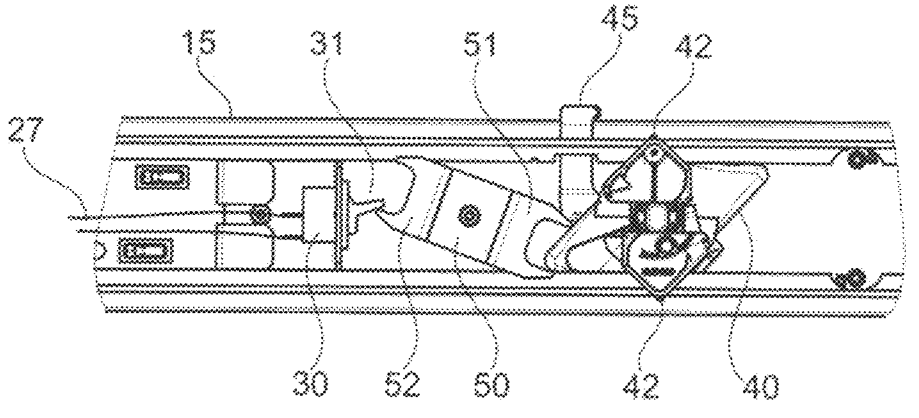

For this purpose, the switching element 30 is coupled to one of the two fastening elements 40. The coupling is effected via a driving element 50 which, like the fastening element 40, is rotatably mounted on the carrier element 15. Said driving element is claw-like at its two end regions 51 and 52 and interacts at one end with the fastening element 40 and at the other end with an actuating part 31 of the switch 30. In particular, this coupling is such that, when the fastening element 40 is in an open position, as shown in FIGS. 6*a* and 6*b*, the driving element 50 is pivoted in such a way that it actuates the switching element 30 by means of the end region 52 or pushes the actuating part 31 into a position in which the control line 27 is interrupted by the switching element 30. If, however, the fastening element 40 is in the locking position, the switching element 30 is actuated by means of the driving element 50 as shown in FIGS. 7*a* and 7*b* in such a way that the control line 27 is not interrupted.

Owing to this special coupling between the fastening element 40 and the switching element 30, which could also be implemented in another way, the luminaire 10 is in a load-free operating state before being connected to the light trunking system 100, since connecting the luminaire 10 to the trunking rail 80 is possible only when the corresponding fastening element 40 is in the open position and the control line 27 is thus interrupted. In this state, the connector 20 is first coupled to the contact socket 95, which can be done safely due to the load-free state of the luminaire 10. The luminaire 10 is then attached to the trunking rail 80 as described above and mechanically fixed by means of the two fastening elements 40. In this case, the fastening elements 40 are pivoted or rotated into the locking position and the switching element 30 is thus actuated in such a way that the interruption of the control line 27 is removed. The load-free state is thus terminated and the luminaire 10 can be operated.

In an analogous manner, when the luminaire 10 is removed from the light trunking system 100, the fastening element 40 is first rotated into the open position, which results in the control line 27 being interrupted and the driver 19 switching to standby mode. In this case, the luminaire 10 can then be removed from the trunking rail 80 and the connector 20 can be detached from the contact socket 95. If in this case the fastening element 40 is inadvertently moved back into the locking position, the additional safety measure explained above, according to which the driver 19 exits the standby mode only after receiving a separate start signal, ensures that the load-free operating state of the luminaire 10 is not inadvertently exited again.

Overall, this opens up the possibility of connecting the luminaire shown in FIGS. 4 to 7 to a DC supply network in a simple and safe manner.

A particularly preferred second exemplary embodiment of the present invention will be explained below with reference to FIGS. 8 and 9, wherein identical components are provided with the same reference signs.

Shown again is a part of a strip luminaire 10 which, in terms of its basic design, is similar to the luminaire according to the first exemplary embodiment of FIG. 4-7. Again, lamps in the form of LED boards (not shown in detail) are provided on an elongate carrier element 15, the light emission from which lamps is influenced by a corresponding optical part 18 arranged on the underside of the carrier element 15. On the upper side of the carrier element 15, by contrast, there is the driver 19, which controls the lamps in a suitable manner after being supplied with power via the DC supply circuit.

Figure 9A:
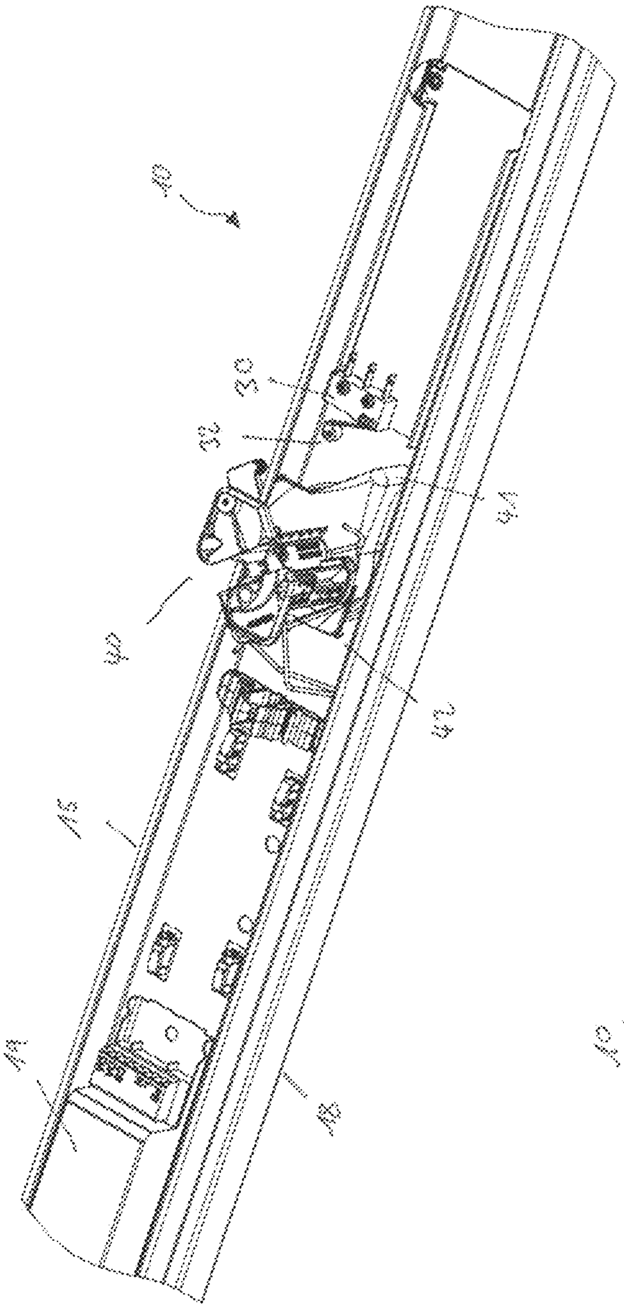
FIGS. 9*a* and 9*b* are representations corresponding to FIGS. 8*a* and 8*b*, wherein the fastening element is now in the locking position.
Figure 9B:
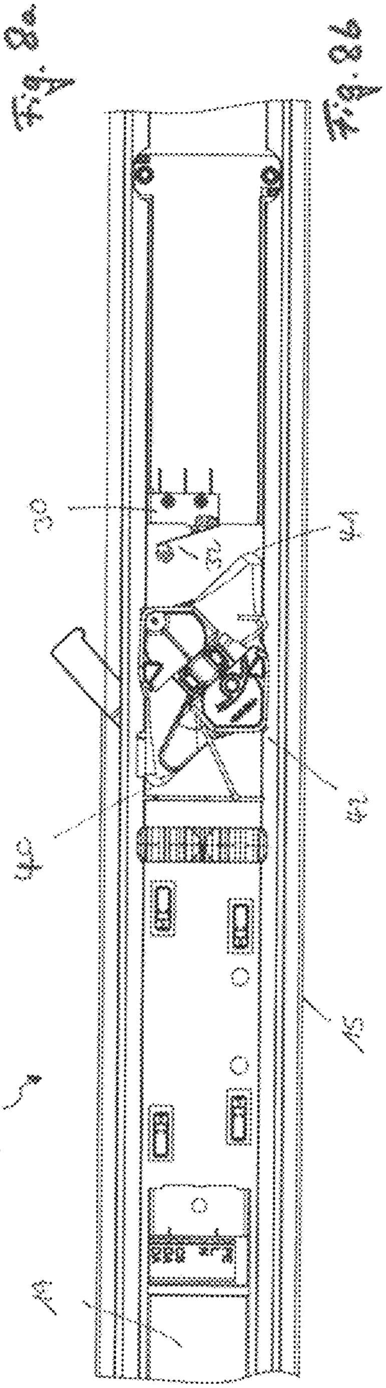
Figure 9A:
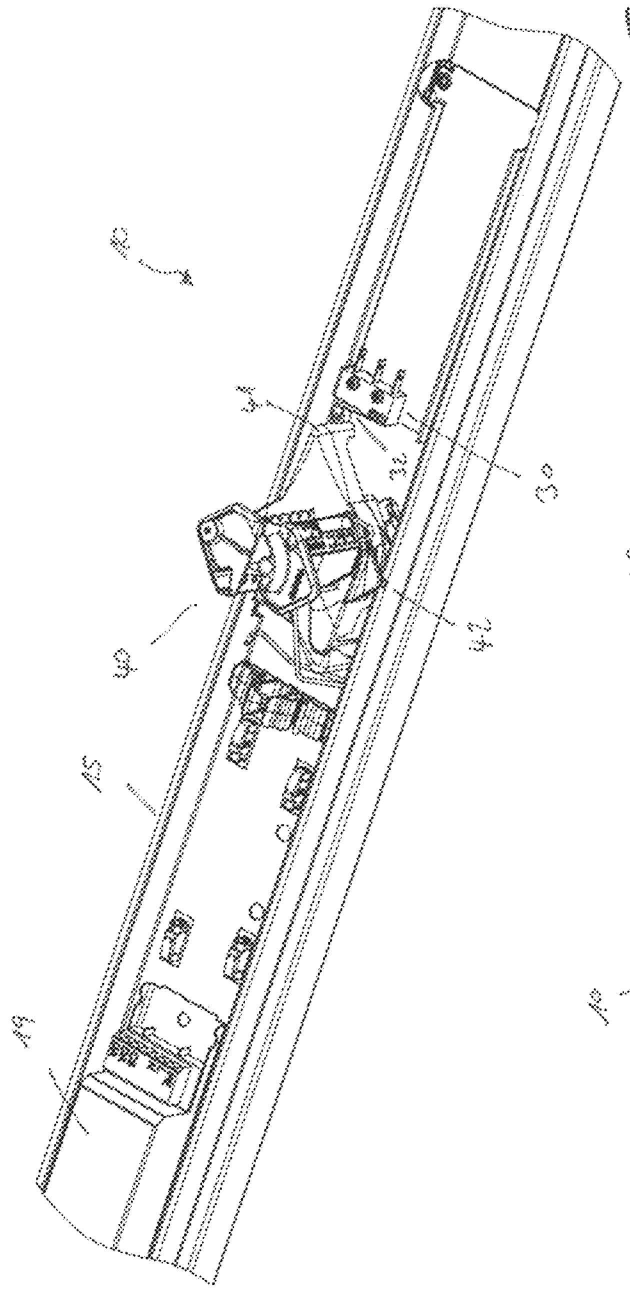
Figure 9B:
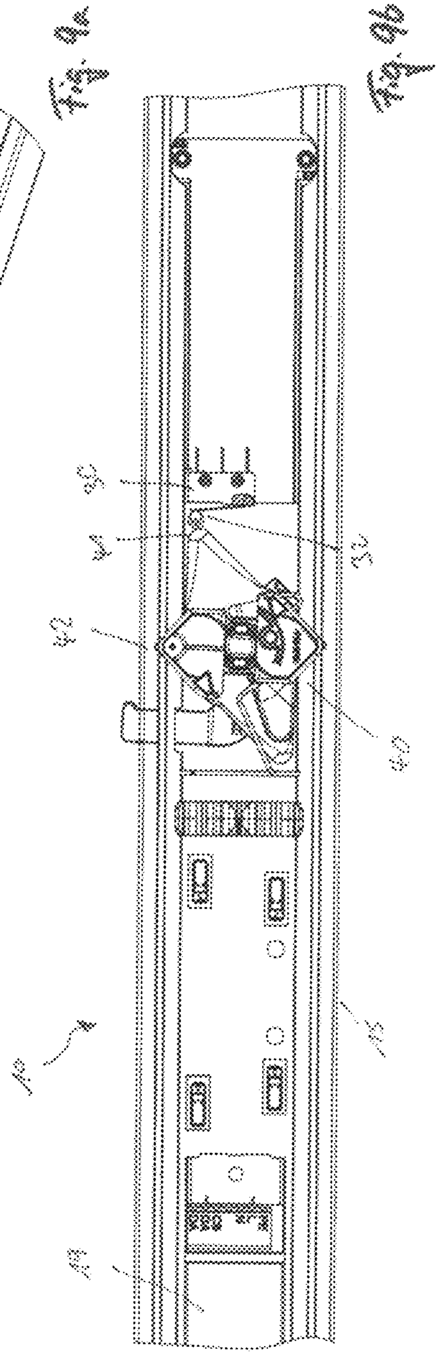

The luminaire 10 according to this second exemplary embodiment is likewise mechanically fastened to a trunking rail via the already mentioned fastening elements 40, which are designed as rotary knobs in the same way as previously explained and can thus be rotated between an open position (shown in FIGS. 8*a* and 8*b*) and a locking position (shown in FIGS. 9*a* and 9*b*). In this case too, locking projections 42 are therefore rotated or pivoted outward, and in the locking position latch onto corresponding projections of the trunking rail so that a mechanical fastening of the luminaire 10 to the trunking rail is obtained.

Deviating from the first exemplary embodiment, however, at least one of the fastening elements 40 is now used to contact the lines of the DC supply circuit, and in this case then simultaneously also forms the electrical connection means. In this case, the corresponding fastening element 40 forms in particular what is known as a contact holder body, on the outside of which outward-facing contacts—not shown in the figures—are arranged.

In the open position of FIGS. 8*a* and 8*b*, the contacts are in a position in which they do not contact the lines of the DC supply circuit 90. In this case, these power supply lines are arranged on the inner sides of the two side walls of the trunking rail 80 in a manner analogous to the "TECTON" system already mentioned, in which they are preferably arranged in carriers made of an insulating material in such a way that they are freely accessible and thus contactable at least over a greater distance, ideally over the entire length of the light trunking system. Corresponding possibilities for accommodating the lines are shown in WO 2001/091250 A1, which is described above.

When the rotary knob 40 is rotated from the open position into the locking position shown in FIGS. 9*a* and 9*b*, the contacts are then pivoted out to the side in such a way that they come into contact with the lines of the DC supply circuit and, if applicable, other lines being used, for example, for signal transmission or the like. This function is therefore identical to the contacting of the power supply and signal transmission lines provided in the "TECTON" system.

In the same way as in the first exemplary embodiment, however, it should again be ensured that, before establishing the electrical connection, but in particular before disconnecting the electrical connection, the luminaire 10 is switched to load-free in order to avoid the occurrence of an arc or sparks.

For this purpose, the luminaire 10 according to the second exemplary embodiment again has a switching element 30, which is now coupled to the fastening element 40. As shown by comparing FIGS. 8 and 9, the fastening element 40 is designed in such a way that it interacts with a spring-mounted switch tongue 32 of the switching element 30 via a lateral projection 41, wherein the switching element 30 is actuated in particular in the locked state, whereas in the open position the switching element 30 is not actuated.

Depending on the rotational position of the fastening element 40, which, as already mentioned, now also simultaneously represents the contacting element, a control line (not shown further in the present case for reasons of clarity) leading from the switching element 30 to the operating device 19 is opened or closed, and on this basis the operating device 19 determines whether operation of the lamps is possible in principle or whether a load-free standby state should be entered. It is not absolutely necessary for the load-free state of the luminaire 10 to be entered when the switch 30 is open. This switch can either be a normally-closed switch or a normally-open switch. It is only essential that, based on the signal present (or not present) at the operating device 19 via the control line 27, the operating device 19 detects whether it should switch to a load-free standby state, which in the example shown is the case when the switch 30 is not actuated.

In particular, the interaction between the fastening element 40 and the switching element 30 is such that the load-free state is already achieved before the contacts move away from the lines of the DC supply circuit accordingly. In this case, the fact that the contacts arranged on the fastening element 40 have a certain degree of flexibility can advantageously be used to allow reliable contacting of the lines of the DC supply circuit. When the fastening element 40 is rotated out of the locking position, the spring tongues of the contacts will therefore remain permanently in contact with the lines of the power supply circuit for a short period of time. The fastening element 40 projection 41 interacting with the switching element 30 is, in contrast, designed in such a way as to actuate the switching element 30 only in the immediate end position, which corresponds to the locking position. However, as soon as the fastening element 40 is rotated out of the locking position to reach the open position, the interaction between the fastening element 40 and the switch 30 is immediately interrupted and the switch 30 is opened or closed accordingly. This occurs in particular at a time when the contact tongues of the contacts are still in contact with the lines of the DC power supply circuit.

The corresponding actuation of the switch 30 is then detected by the operating device 19 in the manner described above, so that said device can immediately switch to the load-free state, in particular before the contacts have become detached from the power supply lines in such a way that there is a risk of an arc being ignited. This ensures safe electrical decoupling of the luminaire 10 from the DC power supply circuit.

This second variant according to the invention also ensures that the luminaire can be safely disconnected from the DC power supply network. Compared with the first variant, however, this second embodiment entails additional advantages.

For example, the fastening element 40, which is in the form of a rotary knob, can be designed in an identical manner to previously known contacting elements. A key advantage is that, compared with the first exemplary embodiment, this form of contacting element offers the possibility of contacting the power supply lines at any location, analogously to the "TECTON" system. This significantly increases the flexibility when designing a larger light trunking system.

It should be noted at this point that the concept implemented in the second exemplary embodiment—of using the element used for the mechanical fastening of the luminaire simultaneously for electrical contact and additionally actuating a switching element by means of which the load-free state is maintained if necessary—is not limited only to the rotational movement shown here of the fastening element. In the same way, solutions are also known in which the fastening/contacting element performs a linear lateral movement in order to contact the lines of a busbar of a light trunking system. In this case too, the contacting element could actuate a corresponding switching element in an analogous manner in order to allow safe connection to or decoupling from a DC supply circuit.

It should also be mentioned that the solution according to the invention has been primarily explained in relation to an elongate strip luminaire. As mentioned at the outset, however, the invention is not limited to such luminaires, but can more generally be implemented for electrical units which are used as part of a light trunking system and are to be connected to a DC supply network. In this context, it is especially important to mention cameras, sensors, luminaires for special emergency lighting or units for communication and general signal transmission.

The invention claimed is:

1. A luminaire (10) supplied with a high-voltage greater than 230V via a DC supply circuit (90), wherein the luminaire (10) has:

means for power consumption (19) from the DC supply circuit (90), said means for power consumption comprising a driver and one or more LED lamps wherein the driver converts the high DC voltage of greater than 230V into a voltage suitable for operation of the one or more LED lamps;

a connection element (20) for coupling to the DC supply circuit (90) in order to electrically connect the means for power consumption (19) to the DC supply circuit, or decoupling from the DC supply circuit (90) in order to electrically disconnect the means for power consumption (19) to the DC supply circuit; and a switching element (30) designed to interrupt or close a control line (27) leading to the driver such that the driver switches to a load-free standby mode when an interruption of the control line (27) or a closure of the control line (27) is detected;

wherein the connection element (20) can be connected to and disconnected from the DC supply circuit (90) supplying the high-voltage greater than 230V when the driver is in load-free standby mode to avoid the risk of electrical arcing while connecting or disconnecting.

2. The luminaire according to claim 1, wherein the driver switches to normal operation after the power supply is restored, or when a signal is again applied to the control line (27), only after a separate activation signal is received.

3. The luminaire according to claim 1, wherein the luminaire (10) is designed to be detachably fastened to a carrier element (80), wherein the carrier element (80) holds power supply lines which form the DC supply circuit (90).

4. The luminaire according to claim 3, wherein the luminaire (10) has at least one mechanical fastening element (40) for detachable fastening to the carrier element (80).

5. The luminaire according to claim 4, wherein the fastening element (40) can be moved between an open position, in which the luminaire (10) can be attached to the carrier element (80) or removed from the carrier element (80), and a locking position, in which the luminaire (10) is locked to the carrier element (80).

6. The luminaire according to claim 5, wherein the fastening element (40) is coupled to the switching element (30) in such a way that the switching element (30) is in a position which switches the luminaire (10) to load-free when the fastening element (40) is in the open position.

7. The luminaire according to claim 5, wherein the connection element is formed by the fastening element, wherein electrical contacts are arranged on the fastening element which contact lines of the DC supply circuit (90) when the fastening element is in the locking position and do not contact the lines of the DC supply circuit (90) when the fastening element is in the open position.

8. The luminaire according to claim 7, wherein the fastening element is coupled to the switching element in such a way that, upon exiting the locking position, the switching element (30) is brought into a position which switches the luminaire (10) or electrical unit to electrically load-free before the electrical connection between the contacts and the lines of the DC supply circuit (90) is interrupted.

9. The luminaire according to claim 4, wherein the connection element (20) is a connector which is separate from the fastening element.

10. The luminaire according to claim 4, wherein the fastening element (40) is rotatably mounted.

11. A light trunking system, having:

an elongate carrier element (80);

power supply lines which extend along the carrier element (80) and are designed to supply the high-voltage DC voltage of greater than 230V; and at least one luminaire (10) according to claim 1, which can be coupled to the power supply lines.

12. The light trunking system according to claim 11, wherein the power supply lines have contacting elements (95) at regular intervals, which can be coupled to the connection element (20) of the luminaire (10).

13. The light trunking system according to claim 11, wherein the carrier element (80) is formed by a substantially U-shaped, downwardly open trunking rail, in the interior (81) of which the power supply lines extend.

14. The luminaire according to claim 1, wherein the control line (27) is a DALI line.

* * * * *